(12) United States Patent
Koike et al.

(10) Patent No.: US 6,292,334 B1
(45) Date of Patent: Sep. 18, 2001

(54) THIN FILM MAGNETIC HEAD COMPRISING SHIELD LAYER HAVING STABILIZED MAGNETIC DOMAIN STRUCTURE

(75) Inventors: Fumihito Koike; Kiyoshi Sato; Naoya Hasegawa, all of Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/364,741

(22) Filed: Jul. 30, 1999

(30) Foreign Application Priority Data

Jul. 31, 1998 (JP) .................................... 10-216870

(51) Int. Cl.[7] ........................................ G11B 5/39
(52) U.S. Cl. ......................................... 360/319
(58) Field of Search ............................ 360/319, 317, 360/126

(56) References Cited

U.S. PATENT DOCUMENTS

| | | |
|---|---|---|
| 3,908,194 | 9/1975 | Romankiw ........................ 360/113 |
| 4,447,839 | 5/1984 | Desserre et al. .................. 360/113 |
| 5,761,011 * | 6/1998 | Miyauchi et al. ................. 360/113 |
| 5,805,392 * | 9/1998 | Mallary et al. ................... 360/113 |
| 5,822,159 * | 10/1998 | Fukuyama et al. ............... 360/113 |
| 5,838,521 * | 11/1998 | Ravipati .......................... 360/113 |
| 5,850,325 * | 12/1998 | Miyauchi et al. ................. 360/113 |
| 5,872,691 * | 2/1999 | Fukuyama et al. ............... 360/113 |
| 6,018,443 * | 1/2000 | Watanabe et al. ................ 360/113 |
| 6,125,009 * | 9/2000 | Ishiwata et al. .................. 360/113 |

* cited by examiner

*Primary Examiner*—Jefferson Evans
(74) *Attorney, Agent, or Firm*—Brinks Hofer Gilson & Lione

(57) ABSTRACT

A lower shield layer is formed in a multilayered structure in which four magnetic layers are laminated with nonmagnetic intermediate layers held therebetween. The static magnetic coupling produced at the end of each of the magnetic layers can promote the condition to put each of the magnetic layers into the single magnetic domain state. An upper shield layer is also formed in a multilayered structure including two magnetic layers so that the two magnetic layers are put into the single magnetic domain state, and the shield function and core function can simultaneously be improved.

36 Claims, 5 Drawing Sheets

DIRECTION OF TRACK WIDTH

DIRECTION OF
TRACK WIDTH

THIN FILM MAGNETIC HEAD COMPRISING SHIELD LAYER HAVING STABILIZED MAGNETIC DOMAIN STRUCTURE

BACKGROUND OF THE INVENTION

1. Field of the Invention

The present invention relates to a MR (magnetoresistive)/inductive combined thin film magnetic head loaded on, for example, a hard disk device, and particularly to a thin film magnetic head comprising a shield layer having a magnetic domain structure stabilized for obtaining stable reproduced signal waveforms in an MR element.

2. Description of the Related Art

FIG. 3 is an enlarged sectional view showing a conventional thin film magnetic head as viewed from the ABS (air bearing surface) side opposite to a recording medium.

This thin film magnetic head is a so-called MR/inductive combined thin film magnetic head comprising a reading head h1 using a magnetoresistive effect and a writing inductive head h2, both of which are laminated at the trailing-side end of a slider, which constitutes, for example, a floating type head.

In the reading head h1, a lower gap layer 2 made of a nonmagnetic material such as $Al_2O_3$ (alumina) or the like is formed on a lower shield layer 1 made of sendust or a NiFe alloy (permalloy), and a magnetoresistive element layer 3 is formed on the lower gap layer 2. The magnetoresistive element layer 3 comprises a spin valve film {a GMR (Giant Magnetoresistive) element} having, for example, an antiferromagnetic layer, a pinned magnetic layer, a nonmagnetic electrically conductive layer, and a free magnetic layer. In the spin valve film, magnetization of the pinned magnetic layer is fixed in the direction perpendicular to the drawing (the depth direction), and magnetization of the free magnetic layer is arranged in the direction of the track width. When a magnetic field enters from a recording medium in the direction perpendicular to the drawing, magnetization of the free magnetic layer is changed to change electric resistance by the relation between fixed magnetization of the pinned magnetic layer and variable magnetization of the free magnetic layer, reproducing a record magnetic field.

Hard magnetic bias layers 4 are formed as longitudinal bias layers on both sides of the magnetoresistive element layer 3. On the hard magnetic bias layers 4 are respectively formed electrode layers 5 made of a nonmagnetic electrically conductive material having low electric resistance, such as Cu (copper), W (tungsten), or the like. An upper gap layer 6 made of a nonmagnetic material such as alumina is further formed on the electrode layers 5.

An upper shield layer 7 is formed on the upper gap layer 6 by plating permalloy or the like so that gap length G11 is determined by the distance between the lower shield layer 1 and the upper shield layer 7. In the inductive head h2, the upper shield layer 7 functions as a leading-side core (lower core layer) for applying a record magnetic field to the recording medium.

A gap layer (nonmagnetic material layer) 9 made of alumina or the like, and an insulation layer (not shown) made of polyimide or a resist material are laminated on the lower core layer 7, and a coil layer 10 formed in a helical pattern is provided on the insulation layer. The coil layer 10 is made of a nonmagnetic electrically conductive material having low electric resistance, such as Cu (copper) or the like. The coil layer 10 is also surrounded by the insulation layer (not shown) made of polyimide or a resist material, and an upper core layer 11 is formed on the insulation layer by using a magnetic material such as permalloy or the like. The upper core layer 11 functions as the trailing-side core of the inductive head h2 for supplying a recording magnetic field to the recording medium.

As shown in FIG. 3, the upper core layer 11 is opposite to the lower core layer 7 with the gap layer 9 held therebetween on the side opposite to the recording medium to form a magnetic gap with a magnetic gap length G12 for supplying a recording magnetic field to the recording medium. Further, a protective layer 12 made of alumina or the like is provided on the upper core layer 11.

In the inductive head h2, a recording current is supplied to the coil layer 10 to supply a recording magnetic field to the upper core layer 11 and the lower core layer 7 from the coil layer 10. As a result, a magnetic signal is recorded on the recording medium such as a hard disk or the like by a leakage magnetic field from the magnetic gap between the lower core layer 7 and the upper core layer 11.

In order to improve stability of signals output from the magnetoresistive layer 3, it is necessary to decrease an inflow of external noise into the magnetoresistive element layer 3. Therefore, it is thought to be necessary that a magnetic field is applied in the direction of the track width during the deposition of the shield layers 1 and 7 or in treatment after the deposition to arrange the uniaxial anisotropic direction of the lower shield layer 1 and the upper shield layer 7 in the direction of the track width so that the direction of the track width becomes the easy axis of magnetization, and the direction (the direction perpendicular to the drawing) perpendicular to the magnetic medium becomes the hard axis of magnetization, thereby preventing magnetization of the shield layers 1 and 7 from adversely affecting the magnetoresistive element layer 3.

However, when each of the lower shield layer 1 and the upper shield layer 7 comprises a single layer made of an NiFe alloy (permalloy), as shown in FIG. 3, the application of a magnetic field in the direction of the track width brings the domain structure of the shield layers 1 and 7 into a multiple magnetic domain state, creating a state wherein magnetic anisotropy is dispersed, as shown in FIG. 4.

Particularly, in the vicinity of the ends of the shield layers 1 and 7, the direction of magnetization is shifted from the direction of the track width, as shown in magnetic domains 13, or perpendicular to the direction of the track width, as shown in magnetic domains 14. As a result of examination of the anisotropic direction in a wafer in the head manufacturing process, in the shield layers 1 and 7 shown in FIG. 4, the variation of the magnetization direction (variation in skew angle) is as large as about ±10°.

The variation in skew angle represents the angle of deviation of magnetization from the direction of the track width. As the variation in skew angle increases, the magnetic reversibility of the shield layers 1 and 7 deteriorates to deteriorate the shield function, and the magnetoresistive element layer 3 held between the shield layers 1 and 7 is affected by the variation of magnetization of the shield layers 1 and 7. For example, when the magnetoresistive element layer 3 comprises a spin valve film, the magnetic domain of the free magnetic layer in the spin valve film, in which magnetization to be arranged in the direction of the track width, is made unstable, thereby causing Barkhausen noise. Particularly, the effect on the magnetoresistive element layer 3 significantly occurs as the gap length G11 shown in FIG. 3 decreases due to an increase in recording density.

A method of decreasing the variation of skew angle is to improve the magnetic material which constitutes the shield layers 1 and 7. As described above, the shield layers 1 and 7 shown in FIG. 7 are made of an NiFe alloy which exhibits an anisotropic magnetic field Hk of as low as about 2 to 4 (Oe), and thus the magnetic domain structure of the shield layers 1 and 7 made of the NiFe alloy is readily made unstable, thereby increasing the variation in skew angle. Therefore, by using a material having a higher anisotropic magnetic field Hk than the NiFe alloy, for example, a CoZrNb alloy (Hk=about 7 to 12 Oe), for the shield layers 1 and 7, the variation in skew angle of the shield layers 1 and 7 can be decreased.

FIG. 5 is a plan view showing the magnetic domain structure of shield layers 1 and 7 made of a magnetic material having a high anisotropic magnetic field Hk, such as a CoZrNb alloy or the like.

It was confirmed that the formation of the shield layers 1 and 7 using a magnetic material having a high anisotropic magnetic field Hk, such as a CoZrNb alloy or the like, permits a decrease in the variation of skew angle to about ±1°.

However, the magnetic domain structure is further subdivided, as shown in FIG. 4. Although the magnetic domains 13 and 14 shown in FIG. 4, in which the direction of magnetization is shifted from the direction of the track width shown in FIG. 3, are made small, such domains actually occur near the ends of the shield layers 1 and 7 shown in FIG. 4.

In this way, by using a magnetic material having a high anisotropic magnetic field Hk for the shield layers 1 and 7, the variation in the skew angle can be decreased, and the effect on improvement in the shield function and the magnetoresistive element layer 3 can be decreased, as compared with the shield layers 1 and 7 made of an NiFe alloy. However, the most preferable magnetic domain structure for the shield layers 1 and 7 is a structure in which magnetization is put into a single magnetic domain state in the direction of the track width. This structure cannot be realized by the conventional shield layers 1 and 7.

The lower shield layer 1 formed below the magnetoresistive element layer 3 has only the shield function, while the upper shield layer 7 formed above the magnetoresistive element layer 3 has not only the shield function but also the function as the lower core of the inductive head. Therefore, it is necessary to simultaneously improve the shield function and the core function.

However, since properties required for improving the shield function are different from those required for improving the core function, it is difficult to simultaneously improve both the shield function and core function when the upper shield layer (lower core layer) 7 comprises a single layer, as shown in FIG. 3.

SUMMARY OF THE INVENTION

The present invention has been achieved for solving the above problems, and an object of the present invention is to provide a thin film magnetic head comprising a shield layer in which the structure and material are improved to put the magnetic domain structure of the shield layer into a single magnetic domain state, improving the shield function of the shield layer and reliability of signals output from a magnetoresistive element layer, as well as the core function of the shield layer.

The present invention provides a thin film magnetic head comprising a magnetoresistive element layer, and shield layers formed to hold the magnetoresistive element layer therebetween, wherein each of the shield layers has a multilayered structure comprising a plurality of magnetic layers laminated with nonmagnetic intermediate layers therebetween, the total absolute value of magnetic moments of the alternate magnetic layers formed with the nonmagnetic intermediate layers held therebetween is set to the same as that of the other magnetic layers, and the opposite magnetic layers with the nonmagnetic intermediate layer held therebetween are magnetized in an antiparallel state in the direction of the track width.

In the present invention, the magnetic layers preferably comprise four, six or eight layers.

The magnetic layers which constitute the shield layers are preferably formed to the same thickness by using the same magnetic material.

In the present invention, each of the magnetic layers which constitute the shield layers preferably has an anisotropic energy E of 1000 (erg/cm$^3$) to 6000 (erg/cm$^3$), and an anisotropic magnetic field Hk of 2.5 (Oe) to 12 (Oe).

The magnetic layers are preferably made of a Fe—M—C alloy (wherein element M is at least one element selected from Ti, Zr, Hf. Nb, Ta, Cr, Mo, Si, P. C, W. B, Al, Ga, Ge, and the rare earth elements), or a soft magnetic film mainly comprising an amorphous structure containing Co as a main component. The soft magnetic film comprising an amorphous structure containing Co as a main component is represented by the composition formula $Co_aT_bX_c$ wherein T is at least one element selected from Zr and Hf, X is at least one element selected from Nb, Ta and Mo, and the composition ratios a, b and c (atomic %) preferably satisfy 78≦a≦s 92, b=(0.1~0.5)×(100−a), and c=100−a−b.

The present invention also provides a thin film magnetic head comprising a lower shield layer, a magnetoresistive element layer formed on the lower shield layer, an upper shield layer formed on the magnetoresistive element layer to have both the shield function and the core function, an upper core layer formed opposite to the upper shield layer with a magnetic gap therebetween on the side opposite to a recording medium, and a coil layer for applying a magnetic field to the upper shield layer and the upper core layer, wherein the upper shield layer comprises two magnetic layers laminated with a nonmagnetic intermediate layer therebetween, the upper magnetic layer of the two magnetic layers has higher saturated magnetization Ms than that of the lower magnetic layer, the upper magnetic layer has a smaller thickness than the lower magnetic layer, the magnetic moment of the upper magnetic layer is set to the same value as the lower magnetic layer, and the two magnetic layers are magnetized in an antiparallel state in the direction of the track width.

In the present invention, the lower magnetic layer of the upper shield layer preferably has an anisotropic energy E of 1000 (erg/cm$^3$) to 6000 (erg/cm$^3$), and an anisotropic magnetic field Hk of 2.5 (Oe) to 12 (Oe).

Each of the magnetic layers which constitute the upper shield layer is preferably made of a Fe—M—C alloy (wherein element M is at least one element selected from Ti, Zr, Hf, Nb, Ta, Cr, Mo, Si, P, C, W, B. Al, Ga, Ge, and the rare earth elements), or a soft magnetic film mainly comprising an amorphous structure containing Co as a main component. The soft magnetic film comprising an amorphous structure containing Co as a main component is represented by the composition formula $Co_aT_bX_c$ wherein T is at least one element selected from Zr and Hf, X is at least one element selected from Nb, Ta and M. When this soft magnetic film is used as the upper magnetic layer of the upper shield layer, the composition ratio a (atomic %) preferably satisfies $85 \leq a \leq 92$, while when this soft magnetic film is used as the lower magnetic layer of the upper shield layer, the composition ratio a (atomic %) preferably satisfies $78 \leq a \leq 88$. For both the upper and lower magnetic layers, the composition ratios b and c (atomic %) preferably satisfy b=(0.1~0.5)×(100−a), and c=100−a−b, and more preferably b=(0.2~0.4)×(100−a).

The soft magnetic film comprising an amorphous structure containing Co as a main component is represented by the composition formula $Co_a Zr_b Nb_c$.

When this soft magnetic film is used as the upper magnetic layer of the upper shield layer, the composition ratio a (atomic %) preferably satisfies $85 \leq a \leq 92$, while when this soft magnetic film is used as the lower magnetic layer of the upper shield layer, the composition ratio a (atomic %) preferably satisfies $88 \leq a \leq 88$. For both the upper and lower magnetic layers, the composition ratios b and c (atomic %) preferably satisfy b=(0.1~0.5)×(100−a), and c=100−a−b, and more preferably b=(0.2~0.4)×(100−a).

In the present invention, Hf may be added in place of element Zr which constitutes the soft magnetic film, or Ta or Mo may be added in place of element Nb which constitutes the soft magnetic film.

The nonmagnetic intermediate layer interposed between the magnetic layers is preferably made of any one of the nonmagnetic materials of Ta, Ti, Au, Pt, $Al_2O_3$ and $SiO_2$, and is preferably formed to a thickness of 100 to 1000 angstroms.

In order to improve the shield function of the shield layers formed above and below the magnetoresistive element layer, the magnetic domain structure of each of the shield layers must be stabilized. Although the adverse effect on the magnetoresistive element layer is conventionally decreased by arranging the easy axis of magnetization of the shield layer in the direction of the track width, it is difficult that in the structure of a conventional shield layer, magnetization of the shield layer is put into a single magnetic domain state in the direction of the track width.

In the present invention, accordingly, the shield layer is provided with a multilayered structure, specifically comprising a plurality of magnetic layers and nonmagnetic l intermediate layers held therebetween, to cause static magnetic coupling between the respective magnetic layers, thereby stabilizing the magnetic domain structure of each of the magnetic layers, and completely putting the magnetization of each of the magnetic layers into a single magnetic domain state according to conditions.

First, in order to promote the condition to put the shield layer into the single magnetic domain state, magnetic moment in each of the magnetic layers is controlled. The magnetic moment is determined by saturated magnetization Ms and the thickness of each of the magnetic layers.

Secondly, in order to promote the condition to put the shield layer into the single magnetic domain state, the number of the magnetic layers which constitute the shield layer is limited.

In the present invention, furthermore, in order to promote the condition to put the shield layer into the single magnetic domain state, the properties of the material of the magnetic layers which constitute the shield layer are limited to improve the magnetic material.

In a so-called combined thin film element comprising a lamination of a reading head and an inductive head, the upper shield layer formed above the magnetoresistive element layer has not only the shield function but also the core function.

Although a conventional upper shield layer comprises a single layer, characteristics required for improving the shield function are different from those required for improving the core function, and thus it is very difficult to simultaneously improve the shield function and the core function of the upper shield layer comprising a single layer.

Therefore, in the present invention, the upper shield layer is provided with a multilayered structure in which the two magnetic layers are laminated with the nonmagnetic intermediate layer held therebetween so that the magnetic layer on the side opposite to the magnetoresistive element layer can function as a shield layer, and the magnetic layer opposite to the upper core layer can function as a core layer.

DESCRIPTION OF THE PREFERRED EMBODIMENT

Figure 1:
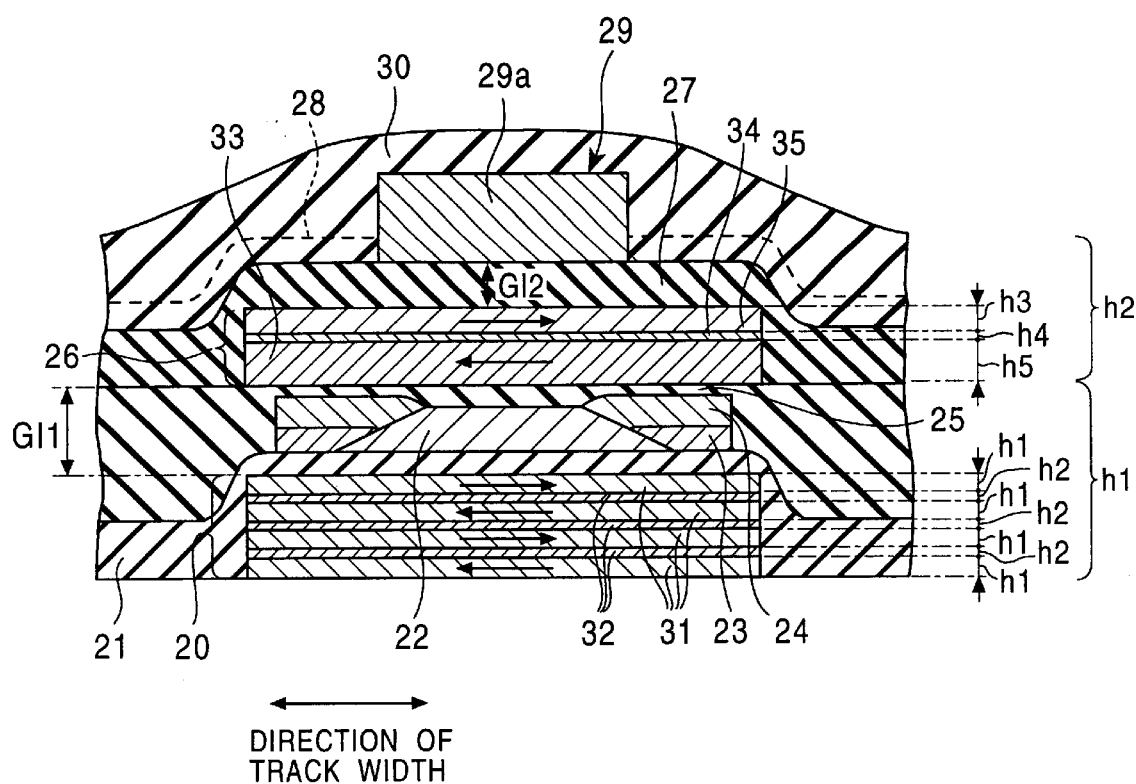
FIG. 1 is a sectional view of the structure of a thin film head in accordance with an embodiment of the present invention as viewed from the side opposite to a recording medium.

FIG. 1 an enlarged sectional view showing a thin film magnetic head in accordance with an embodiment of the present invention as viewed from the side opposite to a recording medium.

The thin film magnetic head shown in FIG. 1 is formed at the trailing-side end of a slider which constitutes a floating type head, and comprises a lamination of a reading head h1 and a recording inductive head h2.

The reading head h1 detects a leakage magnetic field from a recording medium such as a hard disk by using the magnetoresistive effect to read recording signals. A lower shield layer 20 made of a soft magnetic material is formed at the trailing-side end of the slider.

Referring to FIG. 1, a lower gap layer 21 made of a nonmagnetic material such as $Al_2O_3$ (alumina) is formed on the lower shield layer 20. A magnetoresistive element layer 22 is laminated on the lower gap layer 21. The magnetoresistive element layer 22 comprises a GMR element using a giant magnetoresistive effect or an AMR element using an anisotropic magnetoresistive effect, for example, such as a spin valve film.

The simplest structure of the spin valve film comprises four layers including an antiferromagnetic layer, a pinned magnetic layer, a nonmagnetic conductive layer, and a free magnetic layer. Further, hard magnetic bias layers 23 and electrode layers 24 (Cr (chromium) or Cu (copper)) are formed on both sides of the magnetoresistive element layer 22. For example, when a bias magnetic field is applied to the free magnetic layer of the spin valve film from the hard bias magnetic layers 23, magnetization of the free magnetic layer is located in the direction of the track width. On the other hand, magnetization of the pinned magnetic layer of the spin valve film is fixed in the direction (the depth direction) perpendicular to the drawing by an exchange coupling magnetic field with the antiferromagnetic layer. When a magnetic field enters from the recording medium in the direction perpendicular to the drawing, the magnetization of the free magnetic layer, which is located in the direction of the track width, is changed to change electric resistance by the relation between the direction of variable magnetization of the free magnetic layer and the direction of fixed magnetization of the pinned magnetic layer, detecting recording signals.

As shown in FIG. 1, an upper gap layer 25 made of $Al_2O_3$ (alumina) or the like is formed on the magnetoresistive element layer 22 and the electrode layers 24, and an upper shield layer (lower core layer) 26 is formed on the upper gap layer 25. The upper shield layer 26 functions as a shield in the reading head h1, and as a trailing-side core in the recording inductive head h2. In the reading head h1, as shown in FIG. 1, the gap length G11 is determined by the distance between the lower shield layer 20 and the upper shield layer (lower core layer) 26, and thus the lower gap layer 21 and the upper gap layer 25 are preferably formed as thin as possible in order to improve resolution of a leakage magnetic field from the recording medium.

As shown in FIG. 1, a gap layer (nonmagnetic material layer) 27 made of alumina or the like is formed on the upper shield layer 26, and a coil layer 28 is formed on the gap layer 27 with an insulation layer (not shown) of polyimide or resist material held therebetween, the coil layer 28 being patterned to a planar spiral form. The coil layer 28 is made of a nonmagnetic electrically conductive material having low electric resistance, such as Cu (copper) or the like.

Furthermore, the coil layer 28 is surrounded by the insulation layer (not shown) of polyimide or resist material, and an upper core layer 29 made of a soft magnetic material and serving as a trailing-side core of the inductive head h2 is formed on the insulation layer. Referring to FIG. 1, the end 29a of the upper core layer 29 is opposite to the upper shield layer (lower core layer) 26 with the nonmagnetic material layer 27 therebetween to form a magnetic gap having magnetic gap length G12 for supplying a recording magnetic field to the recording medium. Further, a protective layer 30 of alumina or the like is provided on the upper core layer 29.

The present invention is characterized in that the lower shield layer 20 and the upper shield layer are provided with a multilayered structure. First, the structure of the lower shield layer 20 functioning only as a shield is described below.

In the present invention, as shown in FIG. 1, the lower shield layer 20 comprises a multilayered structure in which a plurality of magnetic layers 31 are laminated with nonmagnetic intermediate layers 32 therebetween. A magnetic field in the direction of the track width is applied during deposition of the lower shield layer 20 or heat treatment after deposition and then removed to produce static magnetic coupling between the ends of the opposite magnetic layers 31 with the nonmagnetic intermediate layers 32 held therebetween, creating a state in which the adjacent magnetic layers 31 with the nonmagnetic intermediate layers 23 held therebetween are magnetized in antiparallel in the direction of the track width. For example, in the embodiment shown in FIG. 1, the lower shield layer 20 comprises the four magnetic layers 31, and the nonmagnetic intermediate layers 32 held between the respective magnetic layers.

The static magnetic coupling between the ends of the respective magnetic layers causes a state in which, for example, the lowermost magnetic layer 31 is magnetized in the leftward direction shown in FIG. 1, the second magnetic layer 32 from below is magnetized in the rightward direction shown in FIG. 1, the third magnetic layer 31 from below is magnetized in the leftward direction, and the fourth (uppermost) magnetic layer 31 from below is magnetized in the rightward direction so that the adjacent magnetic layers with the nonmagnetic intermediate layer 32 held therebetween in the vertical direction are magnetized in antiparallel.

The magnetization directions of the respective magnetic layers 31, which constitute the lower shield layer 20 shown in FIG. 1, are arranged in the direction of the track width, so that the direction (the depth direction) perpendicular to the drawing becomes the hard axis of magnetization.

However, in order to promote the condition to put the magnetic domain structure of each of the opposite magnetic layers with the nonmagnetic intermediate layers held therebetween into the single magnetic domain state, it is necessary to set the magnetic moment of each of the magnetic layers to an appropriate value.

In the present invention, the saturated magnetization Ms and thickness of each of the magnetic layers are controlled so that of the plurality of the magnetic layers 31 which constitute the lower shield layer 20, the total absolute value of magnetic moment of the alternate magnetic layers 31 formed with the nonmagnetic intermediate layers 32 held therebetween coincides with that of the other magnetic layers 31. The magnetic moment is determined by the product of the saturated magnetization Ms and the thickness.

When the total absolute value of magnetic moments of the alternate magnetic layers 31 formed with the nonmagnetic intermediate layers held therebetween coincides with that of the other magnetic layers 31, a stable energy state occurs. This permits a magnetization state in which magnetizations of the alternate magnetic layers and the magnetizations of the other magnetic layers are antiparallel, as well as promoting the condition to put each of the magnetic layers 31 into the single magnetic domain state.

In the embodiment shown in FIG. 1, all the four magnetic layers 31 which constitute the lower shield layer 20 are formed to the thickness h1 by using the same magnetic material. Namely, the magnetic layers 31 have the same thickness h1 and saturated magnetization Ms so that the values of magnetic moments of the four magnetic layers, which are determined by the product of the thickness h1 and the saturated magnetization Ms, are set to the same value.

Therefore, the total absolute value of magnetic moments of the lowermost magnetic layer and the third magnetic layer from below, which are alternately formed with the nonmagnetic intermediate layers 32 held therebetween, is set to the same value as that of the other magnetic layers 31, i.e., the second and fourth (uppermost) magnetic layers from below. The static magnetic coupling occurs between the ends of the opposite magnetic layers with the nonmagnetic intermediate layers 32 held therebetween, the opposite magnetic layers with the nonmagnetic intermediate layers 32 held therebetween are magnetized in an antiparallel state, and the condition to put the structure of each of the magnetic layers into the single magnetic domain state is promoted.

In the present invention, the number of the magnetic layers 31 which constitute the lower shield layer 20 is controlled to promote the condition to put the magnetic domain structure of each of the magnetic layers into the single magnetic domain state.

As shown in FIG. 1, the number of the magnetic layers 31 which constitute the lower shield layer 20 is preferably an even number, specifically the number of the magnetic layers is preferably 4, 6 or 8. With too many magnetic layers 31, the production process is undesirably complicated. In the present invention, the number of the magnetic layers 31 may be 2. However, it was confirmed that where the lower shield layer 20 comprises a multilayered structure in which two magnetic layers 31 are laminated with the nonmagnetic intermediate layer 32 held therebetween, even if the two magnetic layers 31 are made of a CoZrNb amorphous alloy having a high anisotropic magnetic field, it is impossible to completely put the magnetic domain structure of the lower shield layer 20 into the single magnetic domain state.

The reason for forming an even number of magnetic layers 31 is that the magnetic moment of each of the magnetic layers 31 can easily be controlled. Where the lower shield layer 20 comprises the four magnetic layers 31 made of the same magnetic material and having the same thickness h1, as shown in FIG. 1, the total absolute value of magnetic moments of the alternate magnetic layers 31 formed with the nonmagnetic intermediate layers 32 held therebetween can easily be coincided with that of the other magnetic layers 31.

In the present invention, the number of the magnetic layers 31 which constitute the lower shield layer 20 is not limited to an even number, and the number may be an odd number as long as the magnetic moment of each of the imagnetic layers 31 can be appropriately controlled. For example, the lower shield layer 20 comprises a multilayered structure in which three magnetic layers 31 are laminated with the nonmagnetic intermediate layers 32 interposed therebetween, the three magnetic layers are made of the same magnetic material, and the thickness of the lowermost and uppermost magnetic layers 31 is half the thickness of the middle magnetic layer 31 so that that total absolute value of magnetic moments of the lowermost and uppermost magnetic layers, which are alternated, can be set to the same value as that of the second (middle) magnetic layer from below. Therefore, a stable energy state can be maintained, and the condition to put each of the magnetic layers 31 into the single magnetic domain state can be promoted.

In the present invention, the anisotropic energy E and anisotropic magnetic field Hk of each of the plurality of magnetic layers 31 which constitute the lower shield layer 20 are controlled in appropriate ranges to promote the condition to put each of the magnetic layers 31 into the single magnetic domain state.

In the present invention, the anisotropic energy E and anisotropic magnetic field Hk of each of the magnetic layers 31 is preferably 1000 to 6000 (erg/cm$^3$) and 2.5 too 12 (Oe), respectively. The anisotropic energy is determined by ½·Hk·Ms (Hk: anisotropic magnetic field, Ms: saturated magnetization).

With an anisotropic energy of 1000 erg/cm$^3$ or less, the anisotropic magnetic field Hk and/or the saturated magnetization Ms are excessively decreased. Even when each of the magnetic layers 31 can be put into the single magnetic domain state, a decrease in the anisotropic magnetic field Hk has the possibility that magnetization of each of the magnetic layers 31 is not properly located in the direction of the track width because the magnetic layers are approximately isotropic. Namely, magnetization of each of the magnetic layers 31 cannot be located in the direction of the track width unless the magnetic layers 31 have some degree of anisotropy. A decrease in the saturated magnetization Ms results in an increase in a film planar antimagnetic field, thereby causing a vertical anisotropic component in the thickness direction. As a result, a noise enters the magnetoresistive element layer due to the vertical anisotropic component.

With an anisotropic energy E of 6000 erg/cm$^3$ or more, magnetic permeability $\mu$ determined by saturated magnetization Ms/anisotropic magnetic field Hk deteriorates. Magnetic materials generally used for the magnetic layers 31 which constitute the lower shield layer 20 have a saturated magnetization Ms of about 14000 G at most, and magnetic materials having higher saturated magnetization Ms than this have the problems of corrosion resistance, etc. As described below, the anisotropic magnetic field Hk is preferably more or less high because stable control of magnetic domains is possible. However, as the anisotropic magnetic field Hk increases, the magnetic permeability $\mu$ determined by saturated magnetization Ms/anisotropic magnetic field Hk deteriorates. High magnetic permeability $\mu$ is an essential property for the lower shield layer 20 having the shield function. Since a decrease in magnetic permeability $\mu$ deteriorates the shield function, in the present invention, the maxim anisotropic energy E is set to 6000 erg/cm$^3$.

In the present invention, the anisotropic magnetic field Hk of each of the magnetic layers 31 which constitute the shield layer 20 is preferably 2.5 to 12 (Oe).

Figure 2:
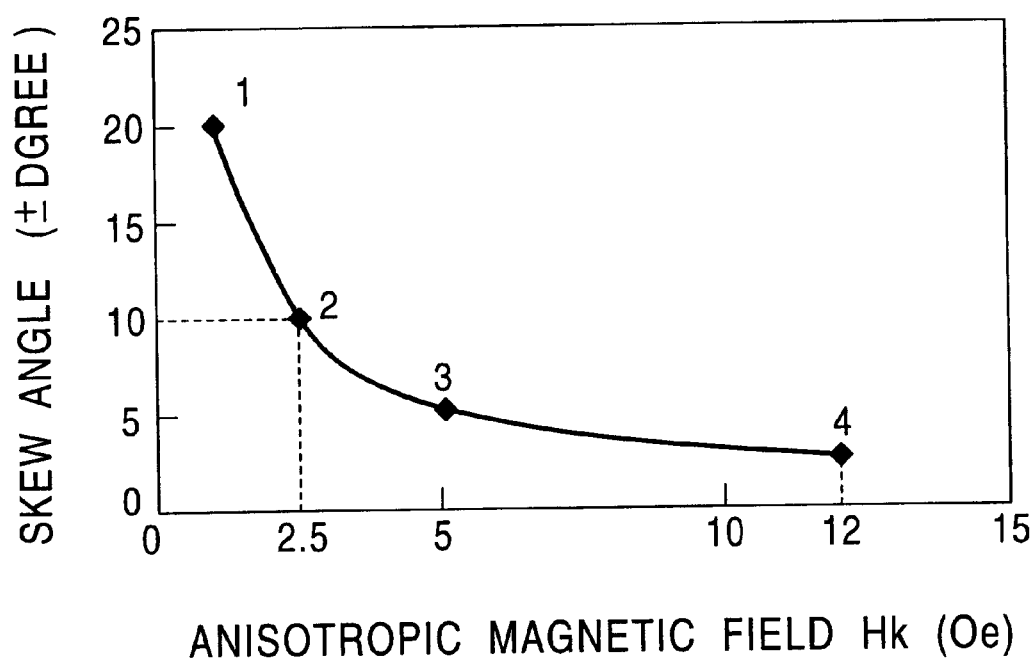
FIG. 2 is a graph showing the relation between the anisotropic magnetic field Hk and the variation in skew angle in a magnetic layer made of a CoZrNb alloy.
Figure 3:
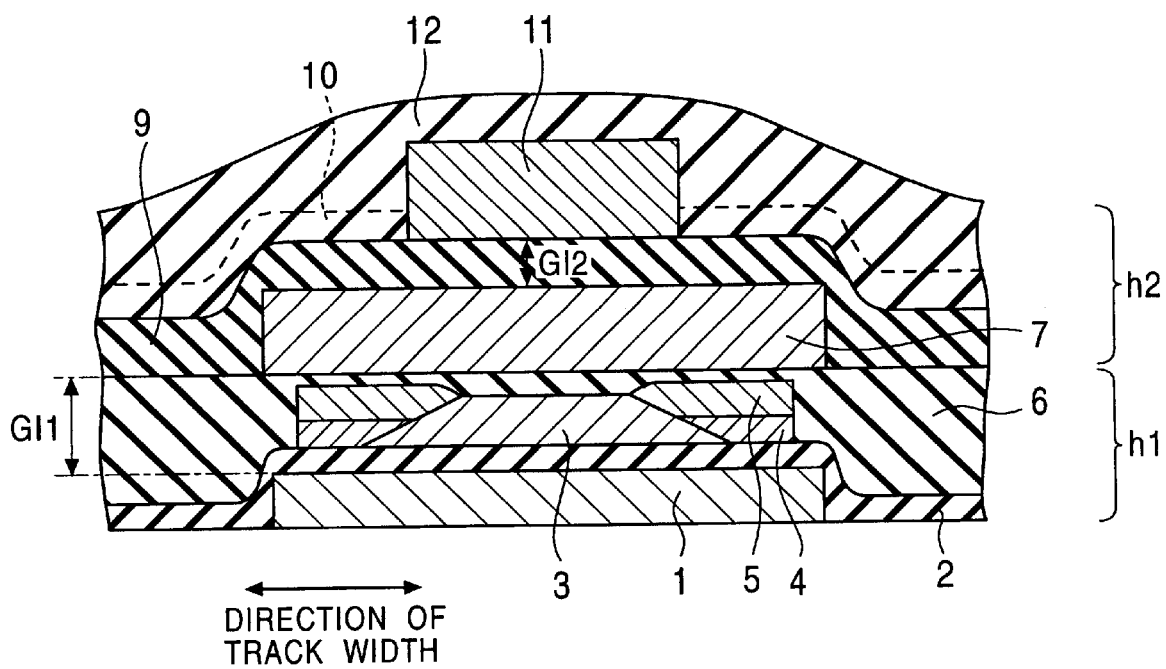
FIG. 3 is a sectional view of a conventional thin film magnetic head as viewed from the side opposite to a recording medium.
Figure 4:
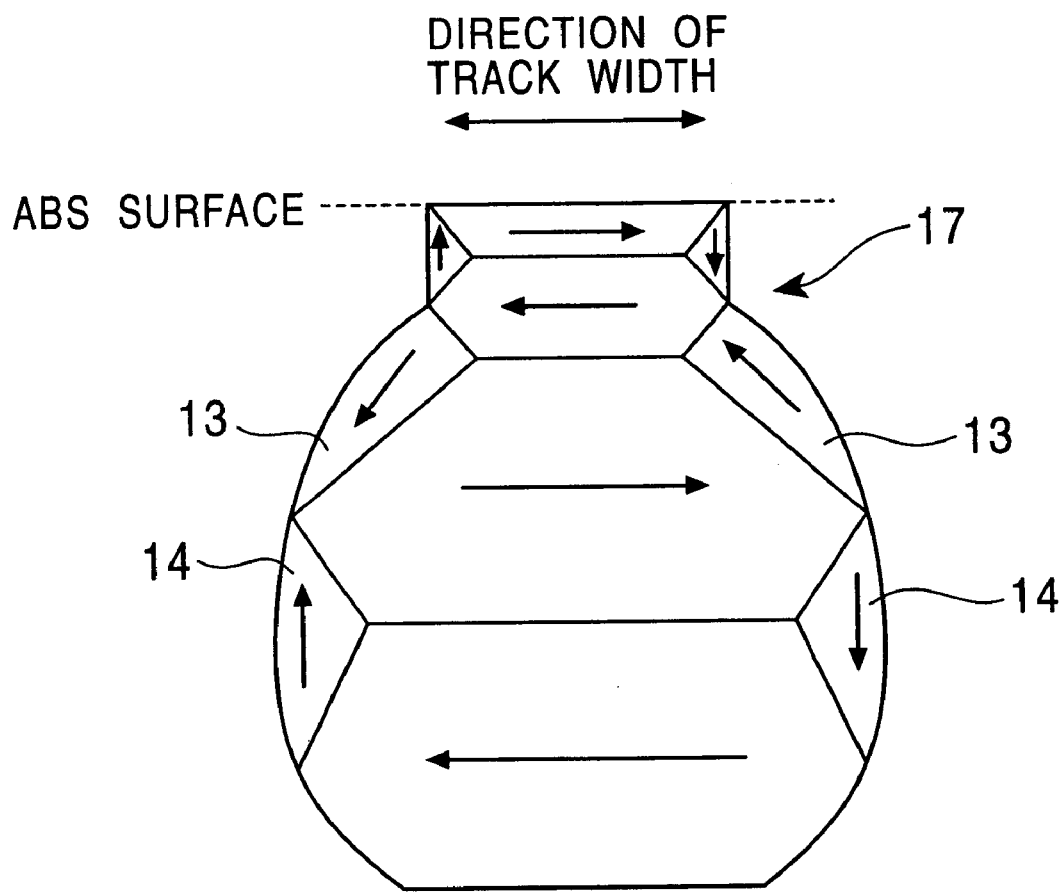
FIG. 4 is a plan view showing the magnetic domain structure of a conventional shield layer made of a NiFe alloy.
Figure 5:
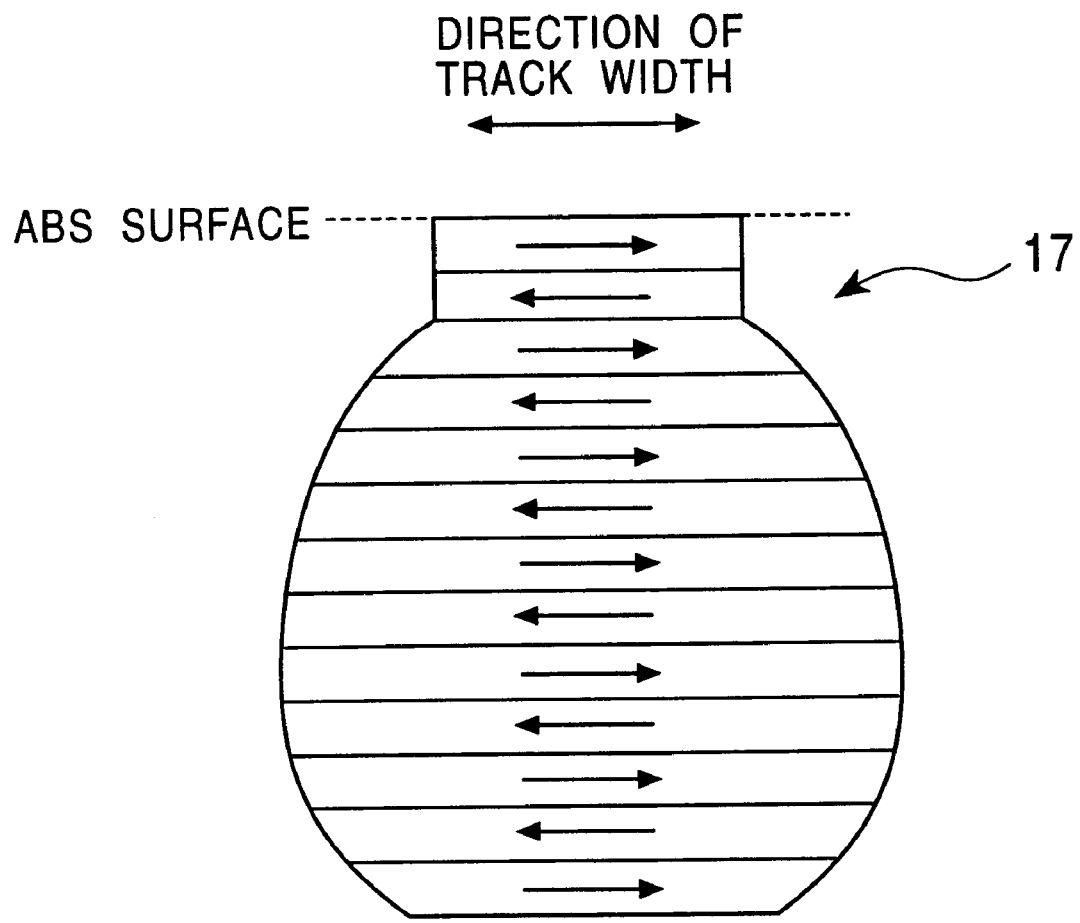
FIG. 5 is a plan view showing the magnetic domain structure of a conventional shield layer made of a CoZrNb alloy.

FIG. 2 is a graph showing the relation between the anisotropic magnetic field Hk and variation in skew angle in a multilayered structure shield layer comprising four magnetic layers made of a CoZrNb amorphous alloy, and nonmagnetic intermediate layers (Ta) interposed therebetween. The composition of the CoZrNb amorphous alloy used in experiment contained 86.7 at % of Co, 4.1 at % of Zr and 9.2 at % of Nb.

In experiment, four shield layers having the above multilayered structure were prepared, and each of the shield layers was annealed at 350° C. for 1 hour under a magnetic field of 1 kOe applied in the direction of the track width (the easy axis of magnetization). Then, the shield layers 1 to 3 shown in the graph of FIG. 2 were subjected to the following heat treatment.

The shield layer 1 shown in the graph of FIG. 2 was subjected to heat treatment at 300° C. for 1 hour in a magnetic field in the depth direction (the hard axis of magnetization). The shield layer 2 shown in the graph of FIG. 2 was subjected to heat treatment at 270° C. for 1 hour in a magnetic field in the depth direction (the hard axis of magnetization). The shield layer 3 shown in the graph of FIG. 2 was subjected to heat treatment at 240° C. for 1 hour in a magnetic field in the depth direction (the hard axis of magnetization). Then, the anisotropic magnetic field Hk and variation in skew angle of each of the shield layers 1 to 4 were measured.

The variation in skew angle represents the anisotropic direction with the direction of the track width set to 0°, and is shown by (maximum—minimum)/2. The smaller the variation in skew angle, the more the magnetization of each of the magnetic layers is arranged in the direction of the track width.

FIG. 2 indicates that as the anisotropic magnetic field Hk increases, the variation in skew angle decreases.

In the present invention, the variation in skew angle is preferably ±10° or less, and thus the anisotropic magnetic field Hk is set to 2.5 (Oe) or more. As the anisotropic magnetic field Hk increases, the variation in skew angle decreases, thereby facilitating control of the magnetic domain of each of the magnetic layers. However, with an excessively high anisotropic magnetic field Hk, the above-described decrease in magnetic permeability becomes a problem. Therefore, in the present invention, the maximum anisotropic magnetic field Hk is set to 12 Oe.

By forming the lower shield layer 20 under the conditions described in detail above, the static magnetic coupling is produced at the ends of the plurality of magnetic layers, which constitute the lower shield layer 20, so that the adjacent magnetic layers 31 in the vertical direction are magnetized in an antiparallel state in the direction of the track width, and the condition to put each of the magnetic layers 31 into the single magnetic domain state can be promoted. The single magnetic domain structure can decrease the adverse effect on the magnetoresistive element layer 22 formed on the lower shield layer 20. For example, when the magnetoresistive element layer 22 comprises a spin valve film, magnetization of the free magnetic layer, which varies with an external magnetic field, is not disturbed by the magnetic domain structure of the lower shield layer, and thus an appropriate magnetization state can be maintained.

Since the magnetization of each of the magnetic layers 31 which constitute the lower shield layer 20 can be put into the single magnetic domain state in the direction of the track width, the magnetization of each of the magnetic layers 31 can easily be reversed with an external signal while maintaining the single magnetic domain. Therefore, it is possible to improve the shield function of the lower shield layer 20, and limit signals input to the magnetoresistive element layer 22 from the medium.

Description will now be made of the structure of the upper shield layer 26 formed on the magnetoresistive element layer 22. Since, as described above, the upper shield layer 26 functions as not only the shield layer but also the core layer of the inductive head, a structure is necessary in which the shield function and the core function can be simultaneously improved.

In the present invention, like the above-described lower shield layer 20, the upper shield layer 26 comprises a multilayered structure in which a plurality of magnetic layers are laminated with nonmagnetic intermediate layers held therebetween. However, the preferred structure, etc. of the upper shield layer 26 are different from those of the lower shield layer 20.

As shown in FIG. 1, the upper shield layer 26 comprises a multilayered structure in which an upper magnetic layer 35 laminated on a lower magnetic layer 33 with a nonmagnetic intermediate layer 34 held therebetween. Although, in the lower shield layer 20, the number of the magnetic layers 31 is preferably 4, 6 or 8 rather than 2, the upper shield layer 26 preferably comprises two layers including the lower magnetic layer 33 and the upper magnetic layer 35. An increase in number of the magnetic layers which constitute the upper shield layer 26 undesirably causes the formation of a pseudo gap.

Of the magnetic layers which constitute the upper shield layer 26, the lower magnetic layer 33 functions as a so-called upper shield layer having the shield function, and the upper magnetic layer 35 functions as a so-called lower recording core layer having the core function.

Like the plurality of magnetic layers 31 which constitute the lower shield layer 20, the lower magnetic layer 33 preferably has an anisotropic energy E of 1000 to 6000 erg/cm$^3$, and an anisotropic magnetic field Hk of 2.5 to 12 Oe.

On the other hand, the upper magnetic layer 35 functioning as the core layer must have high saturated magnetization Ms required for the core. In the present invention, the upper magnetic layer 35 has higher saturated magnetization Ms than the saturated magnetization Ms of the lower magnetic layer 33. The saturated magnetization Ms is appropriately controlled by changing the composition ratios of the magnetic materials used for the upper magnetic layer 35 and the lower magnetic layer 33.

The nonmagnetic intermediate layer 34 is interposed between the upper magnetic layer 35 and the lower magnetic layer 33, which constitute the upper shield layer 26, so that the magnetic layers 33 and 35 are magnetized in an antiparallel state by the static magnetic coupling produced at the ends of the upper magnetic layer 35 and the lower magnetic layer 33. For example, as shown in FIG. 1, the lower magnetic layer 33 is magnetized in the leftward direction shown in the drawing, and the upper magnetic layer 35 is magnetized in the rightward direction shown in the drawing.

In the upper shield layer 26, it is necessary to promote the condition to put the magnetic layers 33 and 35 into the single magnetic domain state, and thus necessary to appropriately control the magnitude of the magnetic moment of each of the magnetic layers 33 and 35. In the present invention, the magnetic moment of the lower magnetic layer 33 is set to the same as the magnetic moment of the upper magnetic layer 35.

As described above, the saturated magnetization Ms of the upper magnetic layer 35 is higher than that of the lower magnetic layer 33. Since the magnetic moment is determined by the saturated magnetization Ms and the thickness, in the present invention, the thickness h5 of the lower magnetic layer 33 is appropriately set to be larger than the thickness h3 of the upper magnetic layer 35 so that the magnetic moment of the upper magnetic layer 35 is the same as the magnetic moment of the lower magnetic layer 33.

By controlling the magnetic moment as described above, a stable energy state can be maintained, and the magnetic domains of the lower and upper magnetic layers 33 and 35 can be controlled by the static magnetic coupling generated at the ends of both magnetic layers 33 and 35, thereby promoting the condition to put the magnetic layers 33 and 35 into the single magnetic domain state.

Description will now be made of the magnetic materials used for forming the magnetic layers 31 which constitute the lower shield layer 20, and the lower and upper magnetic layers 33 and 35, which constitute the upper shield layer 26.

The characteristics particularly required for improving the shield function include high magnetic permeability $\mu$, a low magnetostrictive constant $\lambda$, and an anisotropic magnetic field Hk of appropriate magnitude. The characteristics particularly required for improving the core function include high saturated magnetization Ms, high resistivity $\rho$, and a high anisotropic magnetic field Hk. Examples of soft magnetic materials having such characteristics include Fe—MC—C alloys (wherein element M is at least one element selected from Ti, Zr, Hf, Nb, Ta, Cr, Mo, Si, P. C, W, B, Al, Ga, Ge, and the rare earth elements).

Most of such soft magnetic films have an amorphous structure containing no or a little microcrystalline phase. The resistivity is high because of the amorphous structure. The saturated magnetization Ms, anisotropic magnetic field Hk, magnetic permeability $\mu$, magnetostrictive constant $\lambda$, etc. can be appropriately controlled by controlling the composition ratios of the soft magnetic film or adding other additive elements so that the soft magnetic film can be used as each of the magnetic layers 31 of the lower shield layer 20 and the lower magnetic layer 33 of the upper shield layer having the shield function, or the upper magnetic layer 35 of the upper shield layer 26 having the core function.

The soft magnetic film mainly comprising the amorphous structure containing Co as a main component will be described below.

The soft magnetic film mainly comprising the amorphous structure containing Co as a main component is represented by the composition formula $Co_aZr_bNb_c$.

When the soft magnetic film is used as each of the magnetic layers 31 which constitute the lower shield layer 20, and the lower magnetic layer 33 of the upper shield layer 26, the composition ratio a (atomic %) of Co is $78 \leq a \leq 92$.

When the soft magnetic film is used as the upper magnetic layer 35 of the upper shield layer 26, the composition ratio a of Co is $85 \leq a \leq 92$.

For both shield layers 20 and 26, the composition ratios b and c (atomic %) of Zr and Nb are as follows:
b=(0.1~0.5)×(100−a), C=100−a−b.

The composition ratio b is more preferably b=(0.2~0.4)×(100−a). In the present invention, Hf and Ta or Mo may be added in place of element Zr and element Nb, respectively. Namely, Co—Hf—Ta alloys and Co—Zr—Mo alloys can also be used in place of Co—Zr—Nb alloys. The composition ratios of the Co—Hf—Ta alloys, etc. are set to the same as the above-mentioned Co—Zr—Nb alloys to obtain appropriate magnetic characteristics.

As described above, when the Co—Zr—Nb alloy is used as the upper magnetic layer 35 of the upper shield layer 26 having the core function, the composition ratio a (atomic %) of Co is set to be $85 \leq a \leq 92$ to increase the saturated magnetization Ms to about 10000 to 14000 G. In addition, high resistivity ρ and high anisotropic magnetic field Hk, which are required for improving the core function, can also be obtained.

When the Co—Zr—Nb alloy is used as the lower magnetic layer 33 of the upper shield layer 26 and each of the magnetic layers 31 of the lower shield layer 20 having the shield function, the composition ratio a (atomic %) of Co is set to be $78 \leq a \leq 88$ to decrease the saturated magnetization Ms to about 6000 to 12000 G. On the other hand, the magnetic permeability μ required for the shield function is increased, and a low magnetostrictive contact λ can be obtained. The anisotropic magnetic field Hk can be set to an appropriate value in the range of 2.5 to 12 Oe.

Each of the magnetic layers which constitute the shield layers 20 and 26 may be made of magnetic material other than the above-described magnetic materials. For example, NiFe alloys (permalloy) conventionally used as the lower shield layer 20 and the upper shield layer 26 can be used. A multilayered structure, in which many magnetic layers made of the NiFe alloy are laminated with nonmagnetic intermediate layers held therebetween, stabilizes the magnetic domain structure and promotes the condition to put magnetization into the single magnetic domain state.

The thin film magnetic head shown in FIG. 1 is a so-called combined thin film magnetic head comprising a lamination of the reading head h1 and the inductive head h2. However, in a thin film magnetic head comprising only the reading head h1, the upper shield layer 26 has only the shield function. In this case, the upper shield layer 26 is preferably formed in a structure in which only the shield function is improved, as in the lower shield layer 20 shown in FIG. 1.

Description will now be made of the material, thickness, etc. of the nonmagnetic intermediate layers interposed between the respective magnetic layers which constitute the shield layers 20 and 26.

The nonmagnetic intermediate layers 32 interposed between the respective magnetic layers of the lower shield layer 20 shown in FIG. 1, and the nonmagnetic intermediate layer 34 interposed between the lower and upper magnetic layers 33 and 35 of the upper shield layer 26 are made of any one of the nonmagnetic materials Ta, Ti, Au, Pt, $Al_2O_3$, and $SiO_2$.

These nonmagnetic materials produce less pin holes even with a small film thickness. The nonmagnetic materials also less diffuse in the interfaces with the magnetic layers. Furthermore, the nonmagnetic intermediate layers 32 and 34 preferably have as high resistivity as possible, and oxide ($Al_2O_3$ and $SiO_2$) nonmagnetic materials are preferably selected in order to obtain high resistivity.

However, where the magnetic layers 31 of the lower shield layer 20, or the lower and upper magnetic layers 33 and 35 of the upper shield layer 26 are made of a crystalline magnetic film (NiFe alloy) or the like, the nonmagnetic intermediate layers 32 and 34 made of an oxide possibly cause disturbance in crystal orientation of the crystalline magnetic film. Therefore, metallic nonmagnetic materials, for example, such as Ta and the like are preferably used for the nonmagnetic intermediate layers 32 and 34.

In the present invention, the thickness h2 of the nonmagnetic intermediate layers 32 formed in the lower shield layer 20, and the thickness h4 of the nonmagnetic intermediate layer 34 formed in the upper shield layer 26 are preferably 100 to 1000 angstroms.

Where the thicknesses h2 and h4 of the nonmagnetic intermediate layers 32 and 34 are less than 100 angstroms, coupling (interlayer exchange coupling or the like) other than static magnetic coupling acts between the magnetic layers, thereby causing difficulties in bringing the magnetizations of the adjacent magnetic layers in the vertical direction into an antiparallel state. Where the thicknesses h2 and h4 of the nonmagnetic intermediate layers 32 and 34 exceed 1000 angstroms, static magnetic coupling less occurs between the magnetic layers, causing problems in that the condition to put magnetization in each of the magnetic layers into the single magnetic domain state cannot be promoted, and that in the upper shield layer 26, the nonmagnetic intermediate layer functions as a pseudo gap during recording.

As described above, in the present invention, each of the upper and lower shield layers of the magnetoresistive element layer comprises a multilayered structure in which a plurality of magnetic layers are laminated with nonmagnetic intermediate layers held therebetween. Therefore, the opposite magnetic layers with the nonmagnetic intermediate layers held therebetween can be magnetized in an antiparallel state by the static magnetic coupling produced at the ends of the magnetic layers, thereby promoting the condition to put into the single magnetic domain state.

Particularly, in the present invention, the total absolute value of magnetic moments of the alternate magnetic layers formed with the nonmagnetic intermediate layers held therebetween coincides with the total absolute value of magnetic moments of the remaining magnetic layers to maintain a stable energy state, thereby further promoting the condition to put each of the magnetic layers into the single magnetic domain state.

In a thin film magnetic head comprising a lamination of a reading head and an inductive head, an upper shield layer formed on a magnetoresistive element layer has not only the shield function but also the core function. In this case, the upper shield layer is preferably formed in a multilayered structure in which two magnetic layers are laminated with a nonmagnetic intermediate layer held therebetween, and the saturated magnetization of the magnetic layer on the side opposite to an upper core layer is preferably higher than that of the magnetic layer on the side opposite to the magnetoresistive element layer. In addition, in the present invention, the thickness of the magnetic layer opposite to the upper core layer is smaller than that of the magnetic layer opposite to the magnetoresistive element layer, and the magnetic moments of both magnetic layers are set to the same value, thereby promoting the condition to put each of the two magnetic layers into the single magnetic domain state.

Furthermore, in the present invention, materials of the magnetic layers which constitute the lower shield layer and upper shield layer are improved. Each of the magnetic layers which constitute the lower shield layer, and the magnetic layer having the shield function in the upper shield layer have an anisotropic energy of 1000 to 6000 erg/cm$^3$, and an anisotropic magnetic field of 2.5 to 12 Oe, thereby stably controlling the formation of the single magnetic domain state.

What is claimed is:

1. A thin film magnetic head comprising a magnetoresistive element layer, and shield layers formed to hold the magnetoresistive element layer therebetween, wherein each of the shield layers comprises a multilayered structure in which a plurality of magnetic layers are laminated with nonmagnetic intermediate layers held therebetween, the total absolute value of magnetic moments of the alternate magnetic layers of the plurality of magnetic layers, which are formed with the nonmagnetic intermediate layers held therebetween, is set to the same value as that of the remaining magnetic layers, and the opposite magnetic layers with the nonmagnetic intermediate layers held therebetween are magnetized in an antiparallel state in the direction of the track width, and wherein the anisotropic energy E of each of the magnetic layers which constitute the shield layers is 1000 to 6000 erg/cm$^3$.

2. A thin film magnetic head according to claim 1, wherein the magnetic layers comprise four layers.

3. A thin film magnetic head according to claim 1, wherein the magnetic layers which constitute the shield layers are formed to the same thickness by using the same material.

4. A thin film magnetic head according to claim 1, wherein the anisotropic magnetic field Hk of each of the magnetic layers which constitute the shield layers is 2.5 to 12 Oe.

5. A thin film magnetic head according to claim 1, wherein each of the nonmagnetic intermediate layers interposed between the respective magnetic layers is made of any one of nonmagnetic materials selected from the group consisting of Ta, Ti, Au, Pt, Al$_2$O$_3$, and SiO$_2$.

6. A thin film magnetic head according to claim 5, wherein each of the nonmagnetic intermediate layers is formed to a thickness of 100 to 1000 angstroms.

7. A thin film magnetic head according to claim 1, wherein the magnetic layers comprise six layers.

8. A thin film magnetic head according to claim 1, wherein the magnetic layers comprise eight layers.

9. A thin film magnetic head comprising a magnetoresistive element layer, and shield layers formed to hold the magnetoresistive element layer therebetween, wherein each of the shield layers comprises a multilayered structure in which a plurality of magnetic layers are laminated with nonmagnetic intermediate layers held therebetween, the total absolute value of magnetic moments of the alternate magnetic layers of the plurality of magnetic layers, which are formed with the nonmagnetic intermediate layers held therebetween, is set to the same value as that of the remaining magnetic layers, and the opposite magnetic layers with the nonmagnetic intermediate layers held therebetween are magnetized in an antiparallel state in the direction of the track width, and wherein each of the magnetic layers is made of a Fe—M—C alloy, wherein element M is at least one element selected from the group consisting of Ti, Zr, Hf, Nb, Ta, Cr, Mo, Si, P, C, W, B, Al, Ga, Ge, and the rare earth elements.

10. A thin film magnetic head according to claim 9, wherein the magnetic layers comprise four layers.

11. A thin film magnetic head according to claim 9, wherein the magnetic layers which constitute the shield layers are formed to the same thickness by using the same material.

12. A thin film magnetic head according to claim 9, wherein each of the nonmagnetic intermediate layers interposed between the respective magnetic layers is made of any one of nonmagnetic materials selected from the group consisting of Ta, Ti, Au, Pt, Al$_2$O$_3$, and SiO$_2$.

13. A thin film magnetic head according to claim 12, wherein each of the nonmagnetic intermediate layers is formed to a thickness of 100 to 1000 angstroms.

14. A thin film magnetic head according to claim 9, wherein the magnetic layers comprise six layers.

15. A thin film magnetic head according to claim 9, wherein the magnetic layers comprise eight layers.

16. A thin film magnetic head comprising a magnetoresistive element layer, and shield layers formed to hold the magnetoresistive element layer therebetween, wherein each of the shield layers comprises a multilayered structure in which a plurality of magnetic layers are laminated with nonmagnetic intermediate layers held therebetween, the total absolute value of magnetic moments of the alternate magnetic layers of the plurality of magnetic layers, which are formed with the nonmagnetic intermediate layers held therebetween, is set to the same value as that of the remaining magnetic layers, and the opposite magnetic layers with the nonmagnetic intermediate layers held therebetween are magnetized in an antiparallel state in the direction of the track width, and wherein each of the magnetic layers comprises a soft magnetic film having an amorphous structure containing Co as a main component.

17. A thin film magnetic head according to claim 16, wherein the soft magnetic film having an amorphous structure containing Co as a main component is represented by the formula Co$_a$T$_b$X$_c$ wherein T represents at least one element selected from the group consisting of Zr and Hf, X represents at least one element selected from the group consisting of Nb, Ta, and Mo, and the composition ratios a, b and c (atomic %) are as follows:

$78 \leq a \leq 92$, b=(0.1~0.5)×(100−a), and c=100−a−b.

18. A thin film magnetic head according to claim 17, wherein the composition ratio b is b=(0.2~0.4)×(100−a).

19. A thin film magnetic head according to claim 16, wherein the magnetic layers comprise four layers.

20. A thin film magnetic head according to claim 16, wherein the magnetic layers which constitute the shield layers are formed to the same thickness by using the same material.

21. A thin film magnetic head according to claim 16, wherein each of the nonmagnetic intermediate layers interposed between the respective magnetic layers is made of any one of nonmagnetic materials selected from the group consisting of Ta, Ti, Au, Pt, $Al_2O_3$, and $SiO_2$.

22. A thin film magnetic head according to claim 21, wherein each of the nonmagnetic intermediate layers is formed to a thickness of 100 to 1000 angstroms.

23. A thin film magnetic head according to claim 16, wherein the magnetic layers comprise six layers.

24. A thin film magnetic head according to claim 16, wherein the magnetic layers comprise eight layers.

25. A thin film magnetic head comprising a lower shield layer, a magnetoresistive element layer formed on the lower shield layer, an upper shield layer formed on the magnetoresistive element layer and having both a shield function and a core function, an upper core layer formed opposite to the upper shield layer with a magnetic gap held therebetween on the side opposite to a recording medium, and a coil layer for applying a magnetic field to the upper shield layer and the upper core layer, wherein the upper shield layer comprises two layers laminated with a nonmagnetic intermediate layer held therebetween, the upper magnetic layer of the two magnetic layers has higher saturated magnetization Ms than that of the lower magnetic layer, and a smaller thickness than that of the lower magnetic layer, the magnetic moment of the upper magnetic layer is set to the same value as the lower magnetic layer, and the two magnetic layers are magnetized in an antiparallel state in the direction of the track width, and wherein the anisotropic energy E of the lower magnetic layer which constitutes the upper shield layer is 1000 to 6000 $erg/cm^3$.

26. A thin film magnetic head according to claim 25, wherein the anisotropic magnetic field Hk of the lower magnetic layer which constituted the upper shield layer is 2.5 to 12 Oe.

27. A thin film magnetic head according to claim 25, wherein each of the nonmagnetic intermediate layer interposed between the magnetic layers is made of any one of nonmagnetic materials selected from the group consisting of Ta, Ti, Au, Pt, $Al_2O_3$, and $SiO_2$.

28. A thin film magnetic head according to claim 27, wherein the nonmagnetic intermediate layer is formed to a thickness of 100 to 1000 angstroms.

29. A thin film magnetic head comprising a lower shield layer, a magnetoresistive element layer formed on the lower shield layer, an upper shield layer formed on the magnetoresistive element layer and having both a shield function and a core function, an upper core layer formed opposite to the upper shield layer with a magnetic gap held therebetween on the side opposite to a recording medium, and a coil layer for applying a magnetic field to the upper shield layer and the upper core layer, wherein the upper shield layer comprises two layers laminated with a nonmagnetic intermediate layer held therebetween, the upper magnetic layer of the two magnetic layers has higher saturated magnetization Ms than that of the lower magnetic layer, and a smaller thickness than that of the lower magnetic layer, the magnetic moment of the upper magnetic layer is set to the same value as the lower magnetic layer, and the two magnetic layers are magnetized in an antiparallel state in the direction of the track width, and wherein each of the magnetic layers which constitute the upper shield layer is made of a Fe—M—C alloy, wherein element M is at least one element selected from the group consisting of Ti, Zr, Hf, Nb, Ta, Cr, Mo, Si, P, C, W, B, Al, Ga, Ge, and the rare earth elements.

30. A thin film magnetic head according to claim 29, wherein each of the nonmagnetic intermediate layer interposed between the magnetic layers is made of any one of nonmagnetic materials selected from the group consisting of Ta, Ti, Au, Pt, $Al_2O_3$, and $SiO_2$.

31. A thin film magnetic head according to claim 30, wherein the nonmagnetic intermediate layer is formed to a thickness of 100 to 1000 angstroms.

32. A thin film magnetic head comprising a lower shield layer, a magnetoresistive element layer formed on the lower shield layer, an upper shield layer formed on the magnetoresistive element layer and having both a shield function and a core function, an upper core layer formed opposite to the upper shield layer with a magnetic gap held therebetween on the side opposite to a recording medium, and a coil layer for applying a magnetic field to the upper shield layer and the upper core layer, wherein the upper shield layer comprises two layers laminated with a nonmagnetic intermediate layer held therebetween, the upper magnetic layer of the two magnetic layers has higher saturated magnetization Ms than that of the lower magnetic layer, and a smaller thickness than that of the lower magnetic layer, the magnetic moment of the upper magnetic layer is set to the same value as the lower magnetic layer, and the two magnetic layers are magnetized in an antiparallel state in the direction of the track width, and wherein each of the magnetic layers which constitute the upper shield layer comprises a soft magnetic film having an amorphous structure containing Co as a main component.

33. A thin film magnetic head according to claim 32, wherein the soft magnetic film having an amorphous structure containing Co as a main component is represented by the formula $Co_aT_bX_c$ wherein T represents at least one element selected from the group consisting of Zr and Hf, X represents at least one element selected from the group consisting of Nb, Ta, and Mo, and the composition ratio a (atomic %) is $85 \leq a \leq 92$ and $78 \leq a \leq 88$ when the soft magnetic film is used as the upper magnetic layer and the lower magnetic layer, respectively, which constitute the upper shield layer, and the composition ratios b and c for both magnetic layers are as follows:

b=(0.1~0.5)×(100−a),and c=100−a−b.

34. A thin film magnetic head according to claim 33, wherein the composition ratio b is b=(0.2~0.4)×(100−a).

35. A thin film magnetic head according to claim 32, wherein each of the nonmagnetic intermediate layer interposed between the magnetic layers is made of any one of nonmagnetic materials selected from the group consisting of Ta, Ti, Au, Pt, $Al_2O_3$, and $SiO_2$.

36. A thin film magnetic head according to claim 35, wherein the nonmagnetic intermediate layer is formed to a thickness of 100 to 1000 angstroms.

* * * * *